L. DAVIDSON.
Car Truck.
No. 94,874.        Patented Sept. 14, 1869.
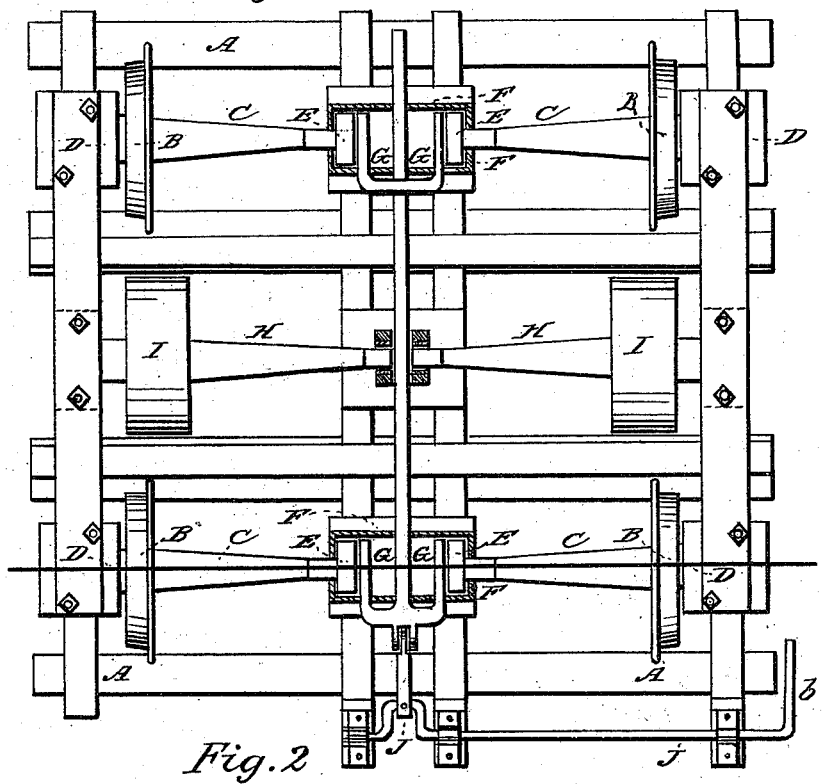
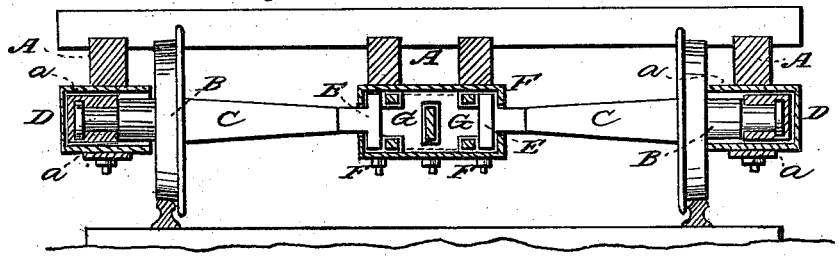
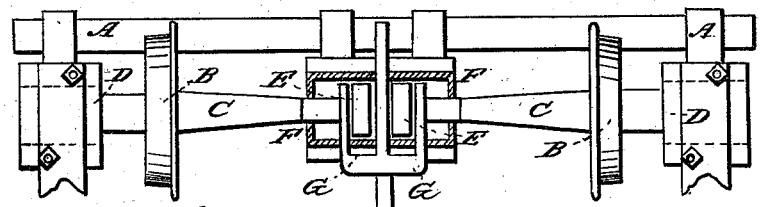

United States Patent Office.

LANCELOT DAVIDSON, OF BRANTFORD, CANADA.

Letters Patent No. 94,874, dated September 14, 1869.

CHANGEABLE-GAUGE RAILWAY-CAR TRUCK.

The Schedule referred to in these Letters Patent and making part of the same.

*To all whom it may concern:*

Be it known that I, LANCELOT DAVIDSON, of Brantford, in the county of Ontario, Canada, have invented a new and improved Changeable-Gauge Railway-Truck; and I do hereby declare that the following is a full, clear, and exact description thereof, which will enable others skilled in the art to make and use the same, reference being had to the accompanying drawings, forming part of this specification, in which—

Figure 1 represents an inverted plan view, partly in section, of my improved railway-truck.

Figure 2 is a vertical transverse section of the same.

Figure 3 is a detail inverted plan view, showing the wheels arranged on narrow gauge.

Similar letters of reference indicate corresponding parts.

This invention relates to that class of trucks of railroad-cars which are adapted to tracks of different gauge, so that every car can be used on roads of different gauge.

The invention consists, first, in locking the transversely-sliding axles, in suitable position, by means of longitudinal slides worked by a lever.

The invention consists, also, in the application to a truck, provided with such adjustable wheels, of non-flanged broad supporting wheels, which are wide enough to fit tracks of all gauges, and which are to relieve the other wheels while they are running, and also while being shifted.

A, in the drawing, is the frame of the truck.

B B are the ordinary flanged wheels of the same.

Every wheel B is mounted on a separate axle, C, so that it may run independent of its mate, and thereby avoid excessive friction on curves.

The axles are, with their outer ends, fitted on to boxes D, which are made sufficiently long to allow the axles some motion in the direction of their length.

The packing $a$ is fitted upon the end of each axle, so as to be carried along during the shifting motion.

The inner ends of the axles are hung in boxes E E, which rest in cases F, that are suspended from the frame A.

The boxes E can slide in the cases F. When pushed out as far as possible, the wheels are in position to fit the broad track, as in fig. 1. When moved together, as in fig. 3, the wheels are fitted to the narrow track.

In either position the boxes E can be locked by sliding forks G, which are connected with each other, and with a crank-shaft, J.

When the handle $b$ of the crank-shaft is moved in one direction, it will withdraw the forks from the cases F, and will thereby release the boxes, and allow the shifting of the wheels.

The shifting is preferably done on converging and diverging rails, which gradually adapt the wheels to the different gauge.

After the wheels have been adjusted, the forks are moved into the cases, and lock the boxes E either against the outer sides of the cases, as in fig. 1, or against a middle partition, as in fig. 3.

I I are a pair of broad non-flanged wheels, hung on axles H, which have their bearings in the frame of the truck, between the wheels B B, as shown.

The wheels G are wide enough to fit all different gauges for which the truck may be intended, and aid in supporting the car, thereby relieving the other wheels B to a considerable extent.

Having thus described my invention,

I claim as new, and desire to secure by Letters Patent—

1. The combination of cases F, boxes E, axles C, and forks G, when arranged substantially in the manner herein shown and described, and for the purpose set forth.

2. The packing $a$ on the outer ends of the axles C, when arranged to slide in the boxes D, together with the axles C, substantially as herein shown and described.

3. The forks G G, adapted to lock the wheels B, and their axles C in suitable positions to fit the car or truck to a suitable gauge, as specified.

4. The non-flanged broad wheels I, when arranged in combination with the shifting wheels B of a changeable-gauge railroad-track, substantially as and for the purpose herein shown and described.

LANCELOT DAVIDSON.

Witnesses:
   GEO. W. MABEE,
   E. TATE.